US012336949B1

(12) United States Patent
Wu

(10) Patent No.: US 12,336,949 B1
(45) Date of Patent: Jun. 24, 2025

(54) ROTARY SEX TOY BASED ON ECCENTRIC LIFTING

(71) Applicant: Hongmei Wu, Luojiang County (CN)

(72) Inventor: Hongmei Wu, Luojiang County (CN)

( * ) Notice: Subject to any disclaimer, the term of this patent is extended or adjusted under 35 U.S.C. 154(b) by 0 days.

(21) Appl. No.: 18/443,195

(22) Filed: Feb. 15, 2024

(51) Int. Cl.
*A61H 19/00* (2006.01)
*A61H 23/02* (2006.01)

(52) U.S. Cl.
CPC ......... *A61H 19/32* (2013.01); *A61H 23/0254* (2013.01); *A61H 2201/1215* (2013.01)

(58) Field of Classification Search
CPC ....................................................... A61H 19/32
See application file for complete search history.

(56) References Cited

U.S. PATENT DOCUMENTS 4,059,100 A * 11/1977 Glage ................ A61H 23/0254 601/72
11,857,483 B1 1/2024 Huang

FOREIGN PATENT DOCUMENTS

CN 117297669 A * 12/2023
DE 202023107383 U1 * 2/2024

* cited by examiner

*Primary Examiner* — Thaddeus B Cox
(74) *Attorney, Agent, or Firm* — Ying-Ting Chen; Law Office of Michael Chen

(57) ABSTRACT

A rotary sex toy based on eccentric lifting may include a mounting bracket, wherein the motor mounting groove is provided on the upper side of the mounting bracket, the lower side of the mounting bracket is provided with the electric push rod mounting groove, the driving motor is provided in the motor mounting groove, the electric push rod is provided in the electric push rod mounting groove, and the driving rod of the electric push rod penetrates through the mounting bracket and is fixedly connected to the driving motor, the rotating component is connected to the output shaft of the driving motor, the connection fixing component is provided on the rotating component, the soft massage part is connected to the upper side of the connection fixing component, the installation component is provided between the connection fixing component and the soft massage part.

9 Claims, 8 Drawing Sheets

ROTARY SEX TOY BASED ON ECCENTRIC LIFTING

FIELD OF THE INVENTION

The present invention relates to the technical field of health massage products, specifically to a rotary sex toy based on eccentric lifting.

BACKGROUND OF THE INVENTION

With the development of the economy and the liberation of public thinking, health massage machines, such as adult toy, are becoming increasingly popular among consumers. In daily life, people are busy with work and face increasing pressure, massage sticks could help people relieve stress and relax, which is beneficial for their physical and mental health and could better promote social harmony.

At present, most of the sex toys on the market are based on vibration function to massage parts of the human body. However, the sex toy of prior art has certain shortcomings, mainly focusing on point vibration or limited vibration, resulting in the small massage range, weak massage effect, and poor consumer experience.

To solve the problems above-mentioned, the present invention provides a rotating sex toy based on eccentric lifting.

SUMMARY OF THE DISCLOSURE

Therefore, in order to overcome the shortcomings of prior art, those skilled in this field provides a rotary sex toy based on eccentric lifting to solve the problems mentioned in the above background: Only massage with point vibration or limited vibration could result in small massage range, weak massage effect, and poor consumer experience effect.

To achieve the above purpose, the present invention provides the following technical solutions:

A rotary sex toy based on eccentric lifting, comprising the mounting bracket, the motor mounting groove is provided on the upper side of the mounting bracket, the lower side of the mounting bracket is provided with the electric push rod mounting groove, the driving motor is provided in the motor mounting groove, the electric push rod is provided in the electric push rod mounting groove, and the driving rod of the electric push rod penetrates through the mounting bracket and is fixedly connected to the driving motor, the rotating component is connected to the output shaft of the driving motor, the connection fixing component is provided on the rotating component, the soft massage part is connected to the upper end of the connection fixing component, the installation component is provided between the connection fixing component and the soft massage part, the shell is provided outside the soft massage part, and the connecting base is provided at the inner bottom of the shell.

In the present invention, the rotating component comprises the installation bracket fixedly connected to the output shaft of the driving motor, the connecting rod is rotatably connected to the installation bracket, and the rotating rod is provided at the other end of the connecting rod, the rotating disc is rotatably connected to the rotating rod, and the connecting fixing component is fixedly connected to the outer circumference of the rotating disc, the sliding groove is provided on the output shaft of the driving motor, and the sliding installation bracket is connected in the sliding groove, the positioning spring is connected at the bottom of one side of the sliding installation bracket away from the connecting rod, and the other end of the positioning spring is connected to the top of the mounting bracket, the other end of the sliding installation bracket is slidably connected to the connecting rod.

In the present invention, the connecting fixing component comprises the column connection block fixedly connected to the rotating disc, and two spring installation grooves are symmetrically arranged on the side walls of the column connection block, wherein the spring is fixedly connected in the spring installation groove, the other end of the spring is fixedly connected to the inserting rod.

In the present invention, the sliding rods are symmetrically arranged on both sides of the motor mounting groove, and sliding holes are provided on both sides of the driving motor, the driving motor is sleeved on the sliding rod through the sliding holes.

In the present invention, the installation component comprises the installation support connected to the soft massage part, the movable support connected to the installation support, and the column installation block provided on the movable support deviating from the center position of the movable support, the column installation block is provided with the groove that matches the column connection block, and two inserting rod grooves that matches the inserting rod are symmetrically arranged on the side wall of the groove.

In the present invention, the connecting hole is provided at the end of installation support connected to the movable support, and multiple connecting holes are arranged in the circular array, reinforcing ribs are provided between adjacent connecting holes. The threaded column is provided at the end of the movable support connected to the installation support, and multiple threaded columns are arranged in the array, the threaded column corresponds one-to-one with the connecting hole.

In the present invention, the accommodation cavity is provided inside the shell, one end of the shell is provided with the installation opening connected to the accommodating cavity, and the soft massage part extends into the accommodating cavity through the installation opening and is connected to the movable support. The upper end of the soft massage part is limitedly matched with the installation opening.

In the present invention, the connecting base is provided at the bottom of the accommodating cavity, and the upper end of the connecting base is connected to the bottom of the mounting bracket.

In the present invention, multiple protrusions are provided on the bottom inner wall of the soft massage part.

The beneficial effects of the present invention are: (1) the present invention provides the rotating component, the rotating component could be driven under the action of the driving motor. The column connection block connected to the upper end of the rotating component drives the bottom of the soft massage part to rotate. Multiple protrusions are provided on the bottom inner wall of the soft massage part, and the soft massage part could effectively increase the massage feelings while rotating. (2) The present invention provides the sliding holes on the driving motor, the position of the driving motor could be adjusted under the action of the electric push rod, due to the positioning spring connected between the sliding installation bracket and the mounting bracket, when the driving motor slides up and down on the sliding rod, the sliding installation bracket slides up and down in the sliding groove. During the sliding process of the sliding installation bracket, the rotating distance of the connecting rod around the output shaft of the driving motor could be adjusted, the operation range of the soft massage part could be expanded to 360 degree, which could stimulate closely from different angles and increase the sense of wrapping, thus improving the consumer experience.

BRIEF DESCRIPTION OF THE DRAWINGS

The attached drawings of the present invention are as follows.

DETAILED DESCRIPTION OF THE PREFERRED EMBODIMENTS

Other features, objects and advantages of the present invention will be more clearly and completely by the detailed description of the non-limiting embodiments with reference to the attached drawings. Obviously, the described embodiments are only part of the embodiments of the present invention, but not all of them. Based on the embodiments of the present invention, all other embodiments obtained by ordinary technicians in the field without creative labor are within the scope of the present invention.

Figure 1:
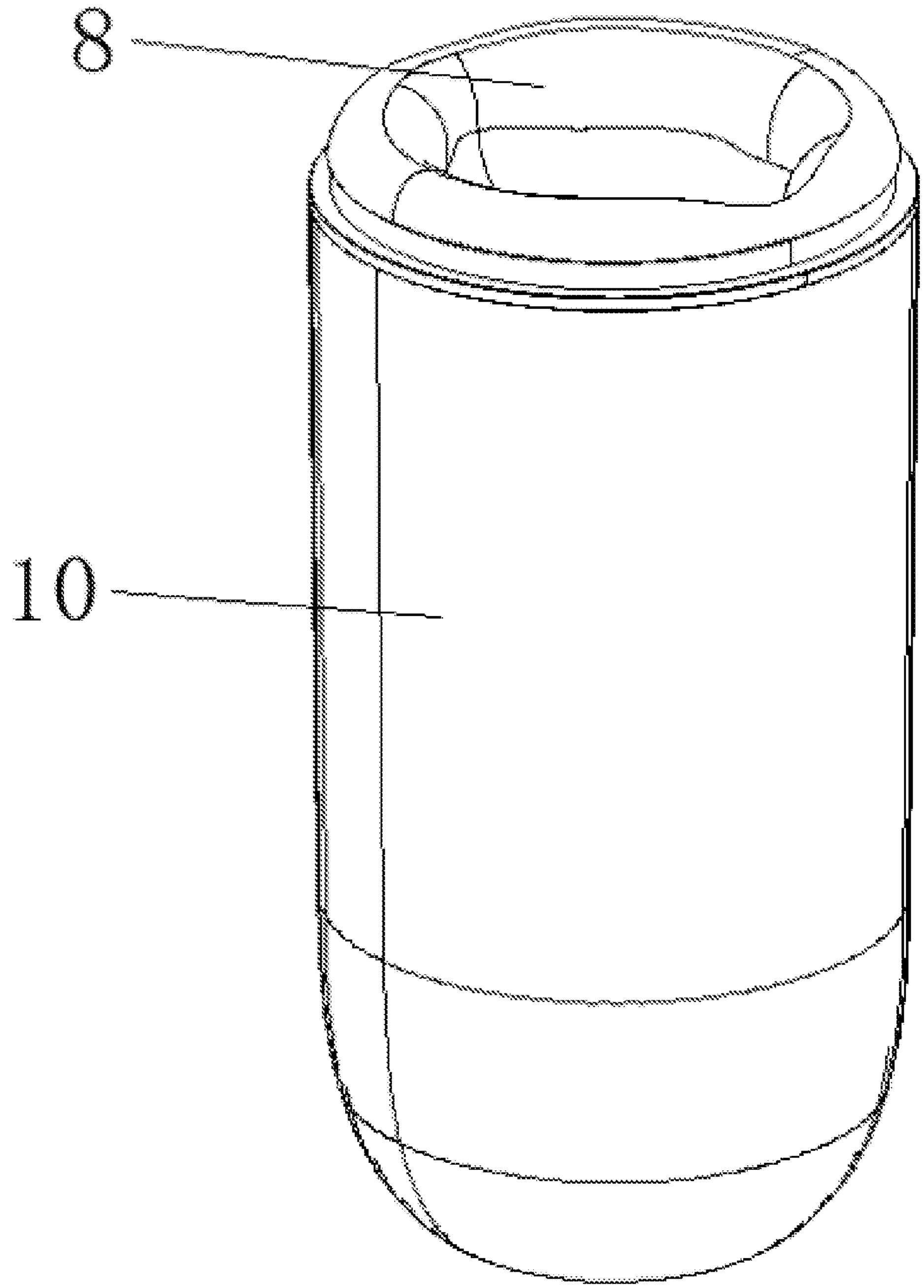
FIG. 1 is the perspective view of the present invention.
Figure 2:
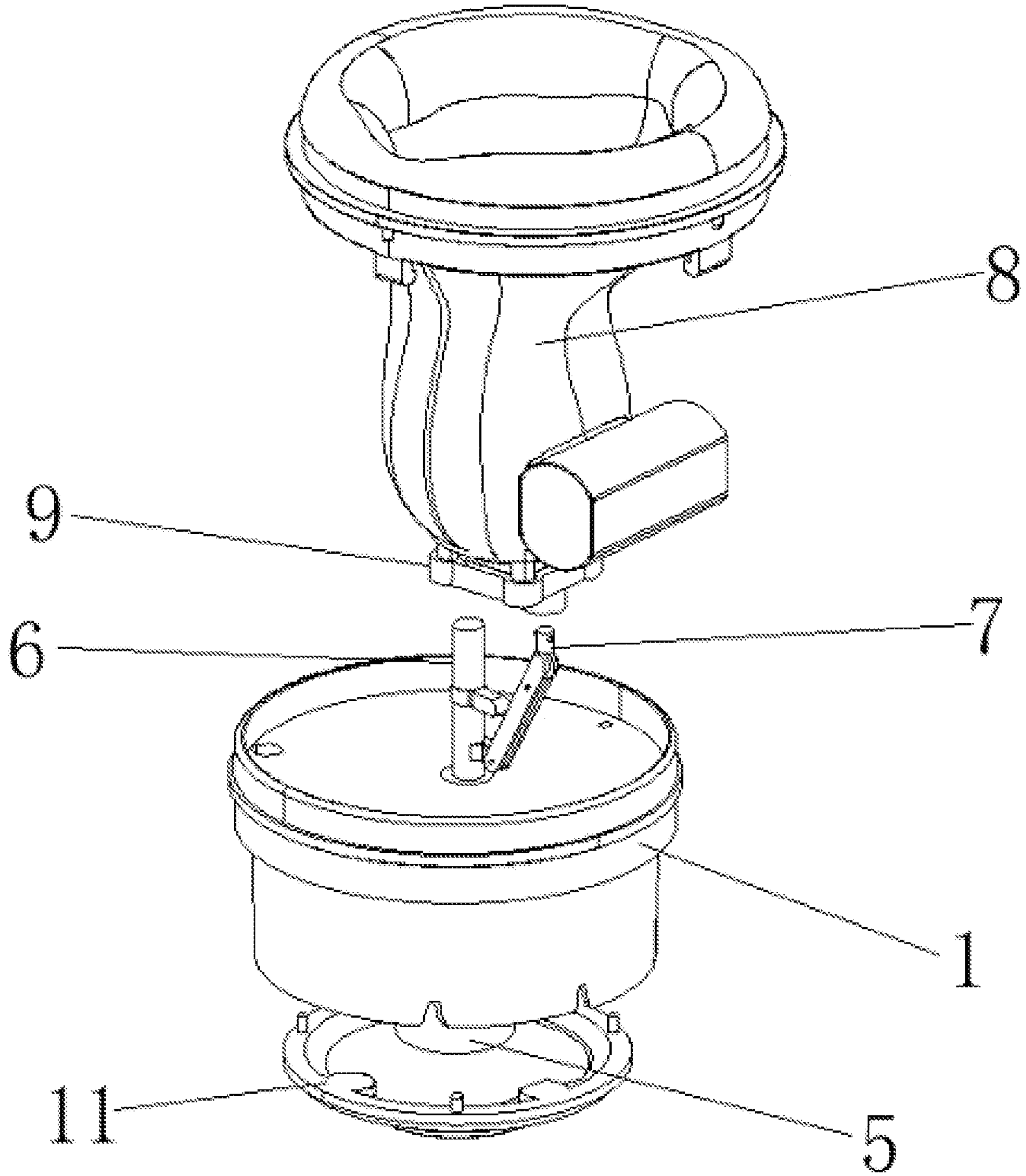
FIG. 2 is the perspective view of the present invention without outer shell.
Figure 3:
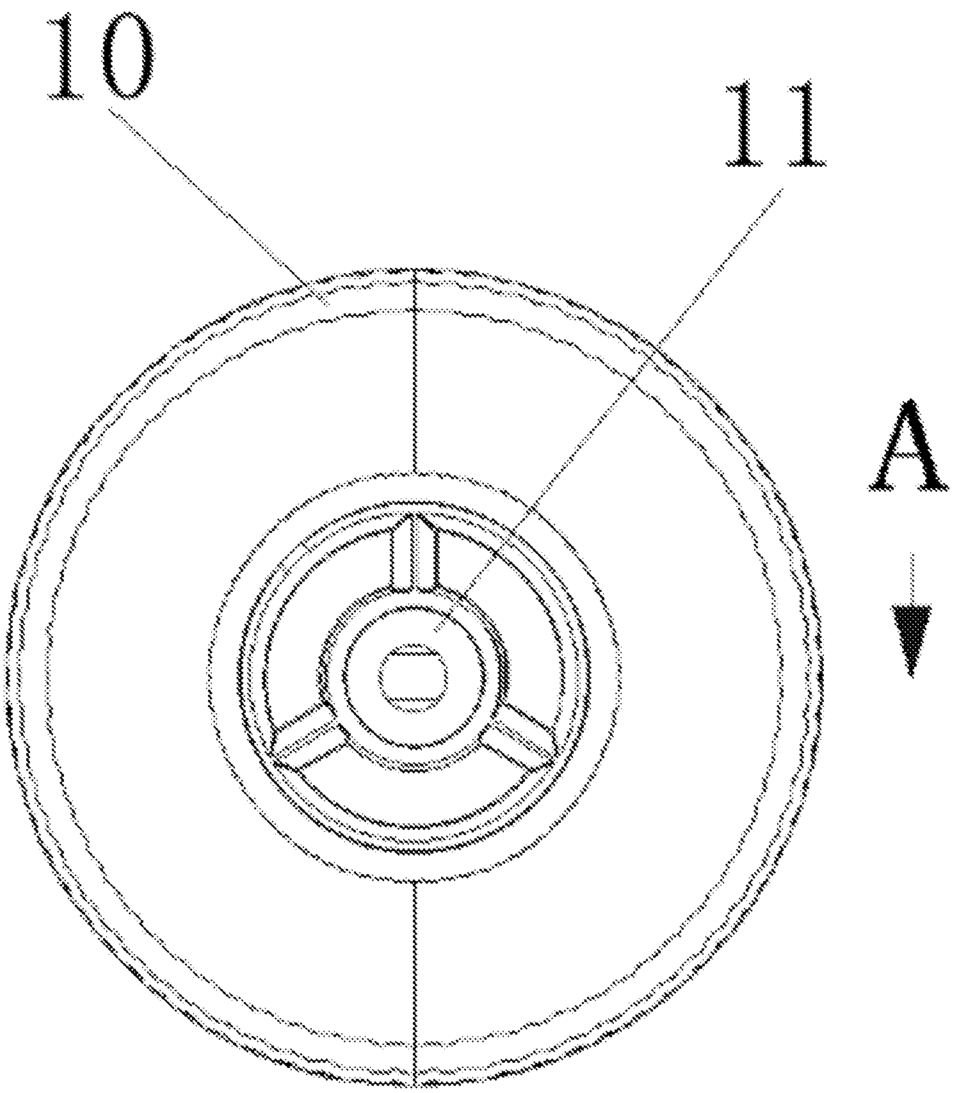
FIG. 3 is the bottom view of the present invention.
Figure 4:
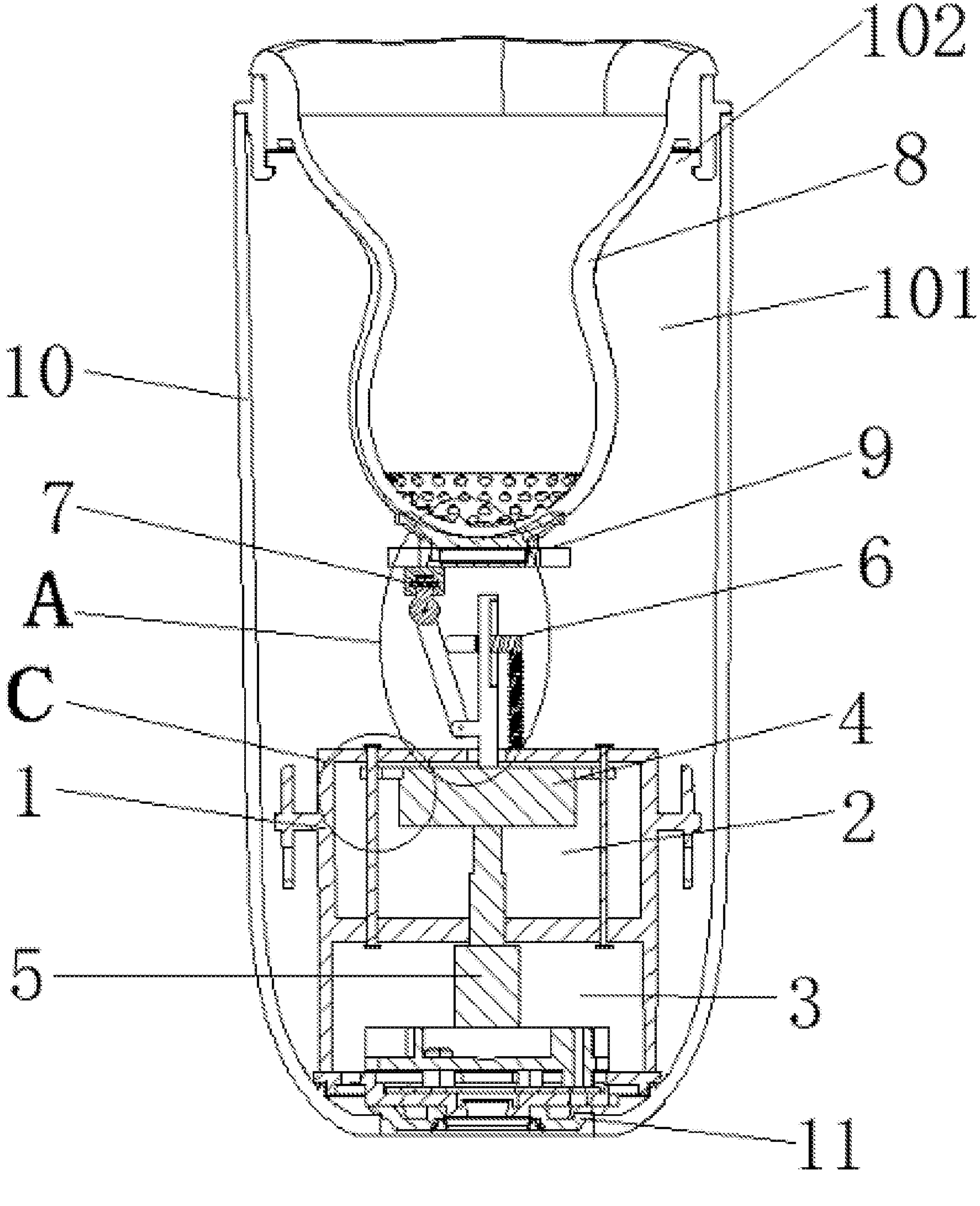
FIG. 4 is the cross-sectional view of the FIG. 3 from A-A direction.
Figure 5:
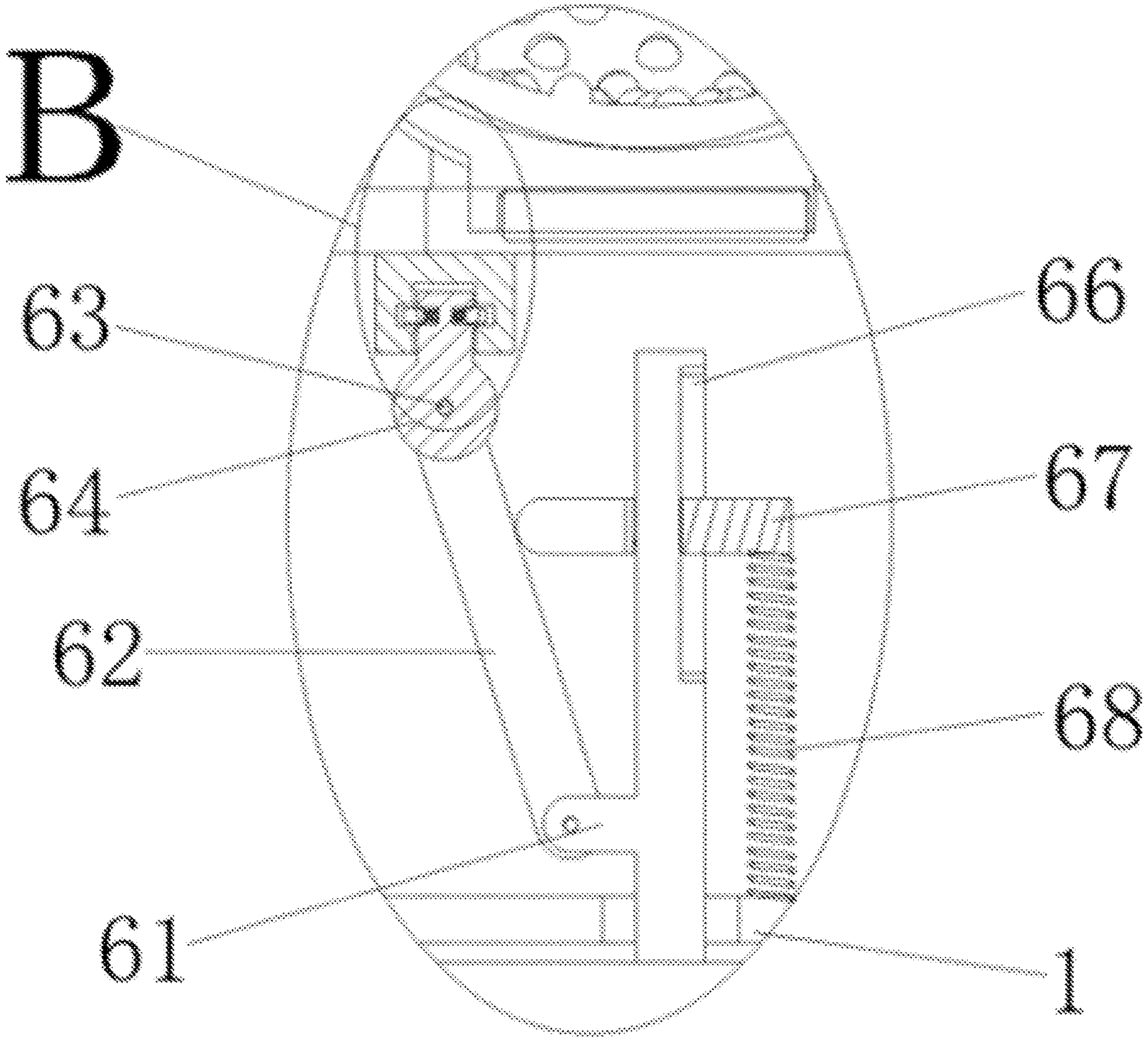
FIG. 5 is the enlarged view at position A in FIG. 4.
Figure 6:
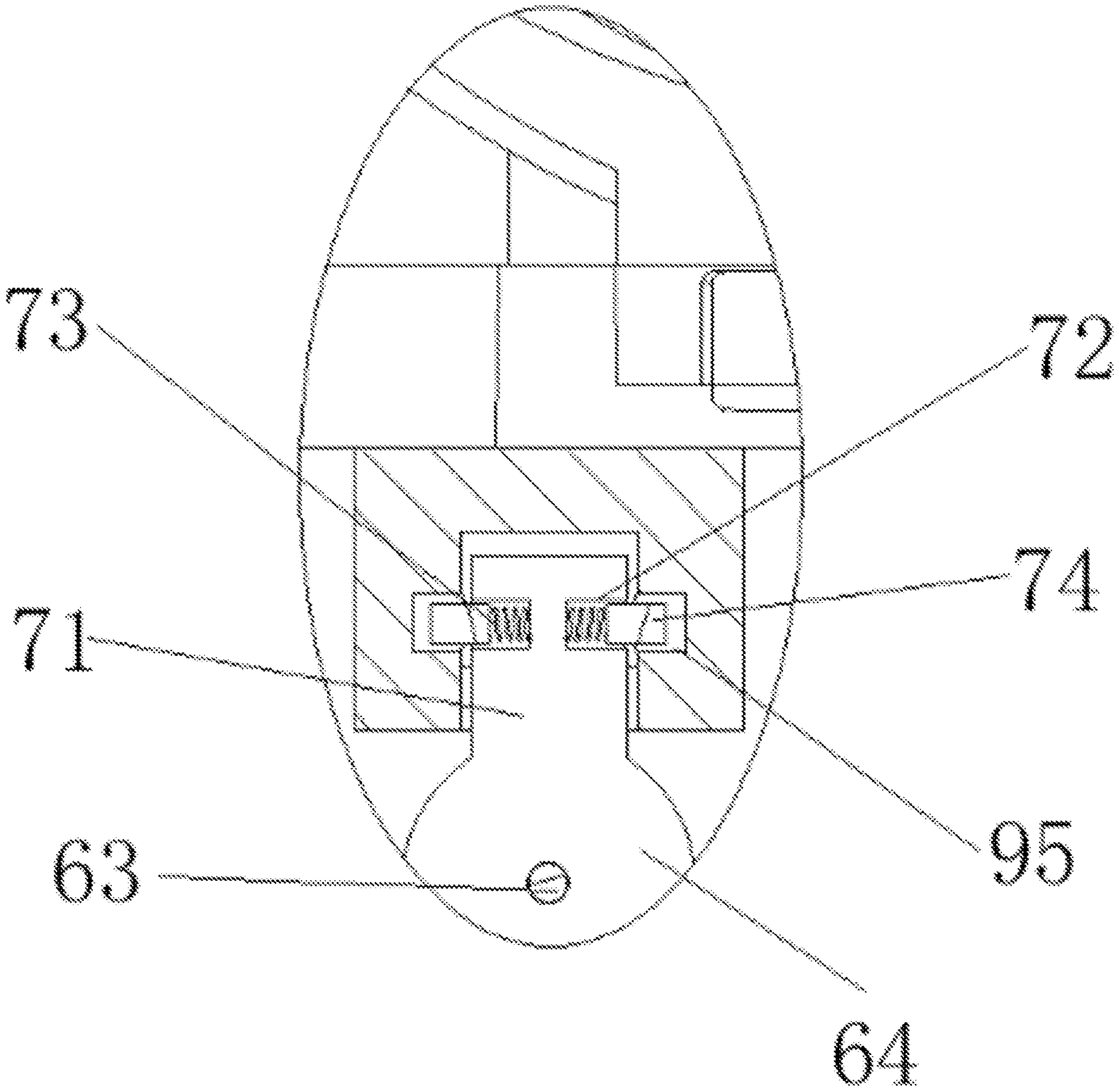
FIG. 6 is the enlarged view at position B in Figure.
Figure 7:
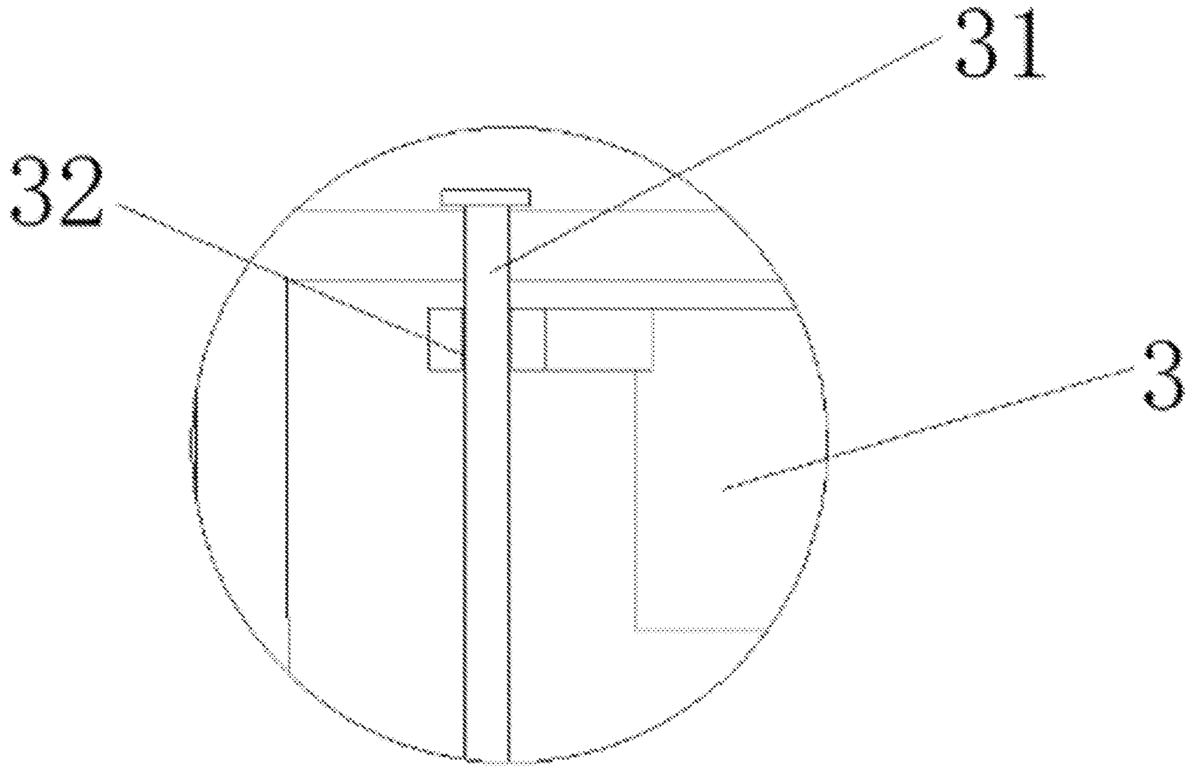
FIG. 7 is the enlarged view at position C in FIG. 4.
Figure 8:
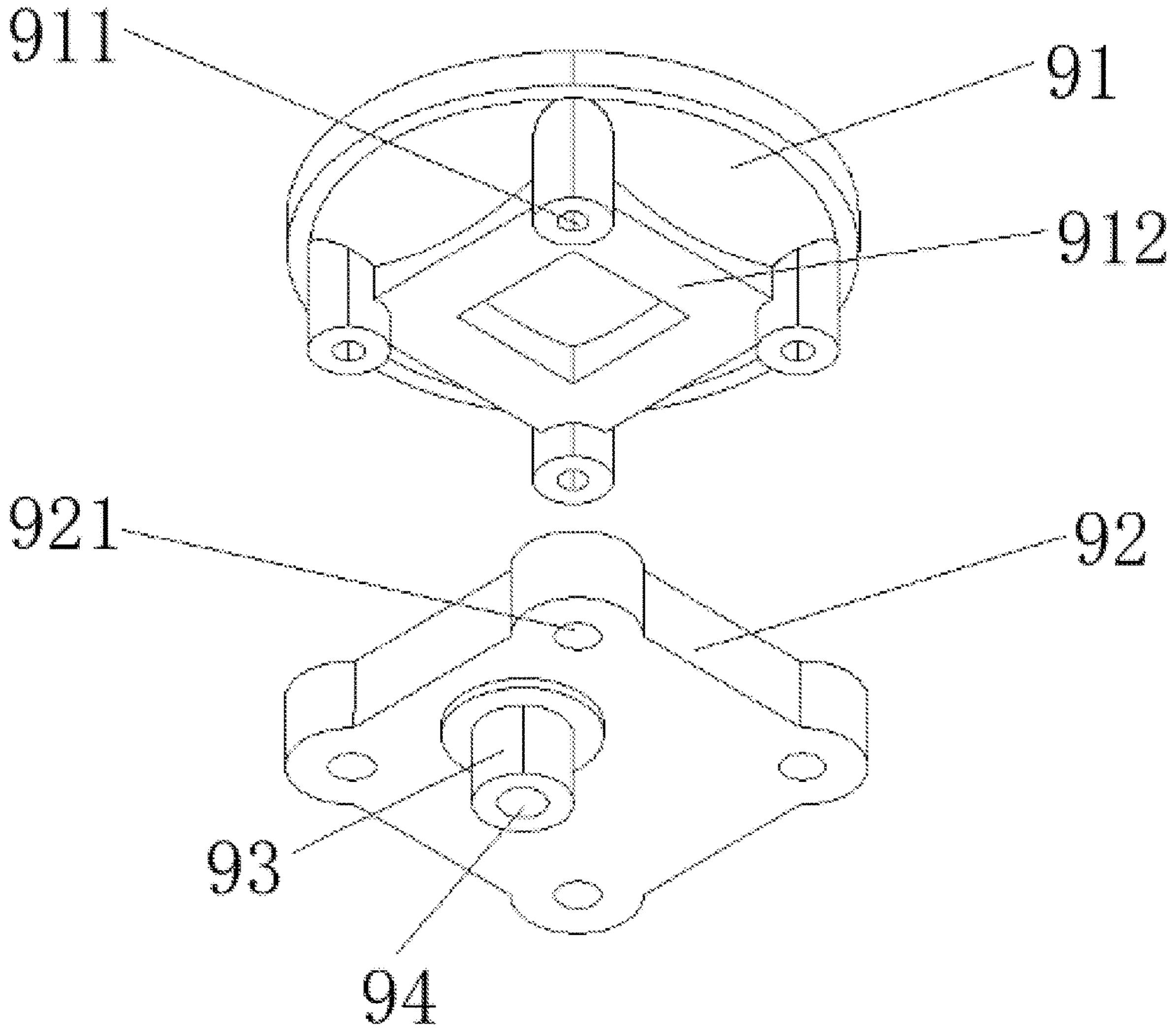
FIG. 8 is the enlarged view of the partial structure of the present invention.

Embodiment 1: As shown in FIGS. 1 to 8, a rotary sex toy based on eccentric lifting, comprising the mounting bracket 1, wherein the motor mounting groove 2 is provided on the upper side of the mounting bracket 1, the lower side of the mounting bracket 1 is provided with the electric push rod mounting groove 3, the driving motor 4 is provided in the motor mounting groove 3, the electric push rod 5 is provided in the electric push rod mounting groove 3, and the driving rod of the electric push rod 5 penetrates through the mounting bracket 1 and is fixedly connected to the driving motor 4, the rotating component 6 is connected to the output shaft of the driving motor 4, the connection fixing component 7 is provided on the rotating component 6, the soft massage part 8 is connected to the upper end of the connection fixing component 7, the installation component 9 is provided between the connection fixing component 7 and the soft massage part 8, the shell 10 is provided outside the soft massage part 8, and the connecting base 11 is provided at the inner bottom of the shell 10.

Furthermore, the rotating component 6 comprises the installation bracket 61 fixedly connected to the output shaft of the driving motor, the connecting rod 62 is rotatably connected to the installation bracket 61, and the rotating rod 63 is provided at the other end of the connecting rod 62, the rotating disc 64 is rotatably connected to the rotating rod 63, and the connecting fixing component 7 is fixedly connected to the outer circumference of the rotating disc 64, the sliding groove 66 is provided on the output shaft of the driving motor 4, and the sliding installation bracket 67 is connected in the sliding groove 66, the positioning spring 68 is connected to the bottom of one side of the sliding installation bracket 67 away from the connecting rod 62, and the other end of the positioning spring 68 is connected to the top of the mounting bracket 1, the other end of the sliding installation bracket 67 is slidably connected to the connecting rod 62.

Furthermore, the connection fixing component 7 comprises the column connection block 71 fixedly connected to the rotating disc 64. Two spring installation grooves 72 are symmetrically arranged on the side walls of the column connection block 71, and the spring 73 is fixedly connected in the spring installation groove 72, the other end of the spring 73 is fixedly connected to the inserting rod 74.

Furthermore, the installation component 9 includes the installation support 91 connected to the soft massage part 8, the movable support 92 connected to the installation support 91, and the column installation block 93 provided on the movable support 92 deviating from the center of the movable support 92, the column installation block 93 is provided with the groove 94 that matches the column connection block 71, and two inserting rod grooves 95 that matches the inserting rod 74 are symmetrically arranged on the side wall of the groove 94.

Furthermore, the connecting hole 911 is provided at the end installation support 91 connected to the movable support 92, and multiple connecting holes 911 arranged in the circular array, the reinforcing rib 912 is provided between adjacent connecting holes 911. The threaded column 921 is provided at the end of the movable support 92 connected to the installation support 91, multiple threaded columns 921 are arranged in the array, and the threaded column 921 corresponds one-to-one with the connecting hole 911.

Furthermore, sliding rods 31 are symmetrically arranged on both sides of the motor mounting groove 2, and sliding holes 32 are provided on both sides of the driving motor 4. The driving motor 4 is sleeved on the sliding rods 31 through the sliding holes 32.

Furthermore, the accommodation cavity 101 is provided inside the shell 10, one end of the shell 10 is provided with the installation opening 102 connected to the accommodating cavity 101, and the soft massage part 8 extends into the accommodating cavity 101 through the installation opening 102 and is connected to the movable support 92. The upper end of the soft massage part 8 is limitedly matched with the installation opening 102.

Furthermore, the connecting base 11 is provided at the bottom of the accommodating cavity 101, and the upper end of the connecting base 11 is connected to the bottom of the mounting bracket 1.

Furthermore, multiple protrusions 81 are provided on the inner wall of the bottom of the soft massage part 8.

In specific embodiments, firstly insert the column connection block 71 into the groove 94 of the column installation block 93, and under the elastic force of the spring 73, insert the inserting rod 74 into the inserting rod groove 95. Then, adjust the driving motor 4 through the electric push rod 5, so that the driving motor 4 slides up and down along the sliding rod 31. There is the positioning spring 68 connected between the sliding installation bracket 67 and the mounting bracket 1, When the driving motor 4 slides up and down, under the action of the positioning spring 68, the sliding installation bracket 67 slides up and down in the sliding groove 66. The other end of the sliding installation bracket 67 is slidably connected to the connecting rod 62, when the sliding installation bracket 67 slides up and down, the distance between the upper end of the connecting rod 62 and the output shaft of the driving motor 4 could be adjusted (i.e. the operating range of the soft massage part 8). The protrusion 81 on the inner wall of the soft massage part 8 could improve the massage feelings of human body during the rotation of the soft massage part 8.

In the present invention, the use of orientation words such as "center", "upper", "lower", "inside", "outside" are only for the convenience of description, rather than indicating or implying the specific orientation, therefore it should not be construed as being limited to the description of the following embodiments. In addition, it should be noted that the terms “first”, “second”, “third” and the like in the description and claims of the present invention and the above drawings are used to distinguish similar objects, which are not necessarily used to describe the specific order or sequence. It is to be understood that the data so used are interchangeable under appropriate circumstances in order to describe the embodiments of the invention herein.

Unless otherwise stated, it should be noted that the terms “installed”, “provided” and “connected” should be understood broadly. For example, “connected” could be fixed connection, detachable connection, integral connection, mechanical connection, electrical connection, direct connection, indirect connection through the intermediate structure, or internal connection between two elements. For those of ordinary skill in this field, the specific meanings of the above terms in the present invention can be understood in specific situations.

In the present invention, the terms “including/comprising” and the like in the description and claims of the present invention and the attached drawings are used to describe the technical features, numerical values, steps or components. One or more other features, numerical values, steps, components or their combinations based on this invention shall be included in the scope of protection of the present invention.

Hereinafter, embodiments of the present invention has been described in detail with reference to the accompanying drawings. While the description above refers to the particular embodiments of the present invention, it will be understood that many modifications may be made without departing from the spirit thereof. Any equivalent replacement or modification would fall within the protection scope of the present invention.

What is claimed is:

1. A rotary sex toy based on an eccentric lifting, comprising a mounting bracket (1), wherein a motor mounting groove (2) is provided on an upper side of the mounting bracket (1), a lower side of the mounting bracket (1) is provided with an electric push rod mounting groove (3), a driving motor (4) is provided in the motor mounting groove (3), an electric push rod (5) is provided in the electric push rod mounting groove (3), and a driving rod of the electric push rod (5) penetrates through the mounting bracket (1) and is fixedly connected to the driving motor (4); a rotating component (6) is connected to an output shaft of the driving motor (4), a connection fixing component (7) is provided on the rotating component (6), a soft massage part (8) is connected to an upper side of the connection fixing component (7), an installation component (9) is provided between the connection fixing component (7) and the soft massage part (8), a shell (10) is provided outside the soft massage part (8), and a connecting base (11) is provided at an inner bottom of the shell (10).

2. The rotary sex toy based on an eccentric lifting according to claim 1, wherein the rotating component (6) comprises a installation bracket (61) fixedly connected to the output shaft of the driving motor, a connecting rod (62) is rotatably connected to the installation bracket (61), and a rotating rod (63) is provided at one end of the connecting rod (62), a rotating disc (64) is rotatably connected to the rotating rod (63), and a connection fixing component (7) is fixedly connected to the outer circumference of the rotating disc (64); a sliding groove (66) is provided on the output shaft of the driving motor (4), and a sliding installation bracket (67) is connected in the sliding groove (66), a positioning spring (68) is connected at a bottom of one side of the sliding installation bracket (67) away from the connecting rod (62), and an other end of the positioning spring (68) is connected to a top of the mounting bracket (1), one end of the sliding installation bracket (67) is slidably connected to the connecting rod (62).

3. The rotary sex toy based on an eccentric lifting according to claim 2, wherein the connection fixing component (7) comprises a column connection block (71) fixedly connected to the rotating disc (64), and two spring installation grooves (72) are symmetrically arranged on side walls of the column connection block (71), wherein a spring (73) is fixedly connected in each of the spring installation grooves (72), one end of the spring (73) is fixedly connected to an inserting rod (74).

4. The rotary sex toy based on an eccentric lifting according to claim 3, wherein the installation component (9) comprises an installation support (91) connected to the soft massage part (8), a movable support (92) connected to the installation support (91), and a column installation block (93) provided on the movable support (92) deviating from a center position of the movable support (92), the column installation block (93) is provided with a groove (94) that matches the column connection block (71), and two inserting rod grooves (95) that match the inserting rod (74) are symmetrically arranged on a side wall of the groove (94).

5. The rotary sex toy based on an eccentric lifting according to claim 4, wherein a connecting hole (911) is provided at one end of installation support (91) connected to the movable support (92), and multiple connecting holes (911) are arranged in a circular array, reinforcing ribs (912) are provided between adjacent connecting holes (911); a threaded column (921) is provided at one end of the movable support (92) connected to the installation support (91), and multiple threaded columns (921) are arranged in an array, the multiple threaded columns (921) correspond one-to-one with the multiple connecting holes (911).

6. The rotary sex toy based on an eccentric lifting according to claim 4, wherein an accommodation cavity (101) is provided inside the shell (10), one end of the shell (10) is provided with an installation opening (102) connected to the accommodating cavity (101), and the soft massage part (8) extends into the accommodating cavity (101) through an installation opening (102) and is connected to the movable support (92); an upper end of the soft massage part (8) is limitedly matched with the installation opening (102).

7. The rotary sex toy based on an eccentric lifting according to claim 1, wherein sliding rods (31) are symmetrically arranged on both sides of the motor mounting groove (2), and sliding holes (32) are provided on both sides of the driving motor (4), the driving motor (4) is sleeved on each of the sliding rods (31) through the sliding holes (32).

8. The rotary sex toy based on an eccentric lifting according to claim 1, wherein the connecting base (11) is provided at a bottom of an accommodating cavity (101), and an upper end of the connecting base (11) is connected to a bottom of the mounting bracket (1).

9. The rotary sex toy based on an eccentric lifting according to claim 1, wherein multiple protrusions (81) are provided on a bottom inner wall of the soft massage part (8).

* * * * *